Aug. 2, 1966  D. ARONSON  3,263,437
ABSORPTION REFRIGERATION SYSTEM CONTROL
Filed Jan. 17, 1964  10 Sheets-Sheet 1

DAVID ARONSON
INVENTOR.

DAVID ARONSON
INVENTOR.

Aug. 2, 1966  D. ARONSON  3,263,437
ABSORPTION REFRIGERATION SYSTEM CONTROL
Filed Jan. 17, 1964  10 Sheets-Sheet 3

DAVID ARONSON
INVENTOR.

BY Daniel H. Bobis
Atty

DAVID ARONSON
INVENTOR.

DAVID ARONSON
INVENTOR.

BY Daniel H. Bobis
Atty

DAVID ARONSON
 INVENTOR.
BY Daniel A. Bobis
 atty

DAVID ARONSON
*INVENTOR.*

BY Daniel H. Bobis
*Atty*

DAVID ARONSON
INVENTOR.

DAVID ARONSON
INVENTOR.

United States Patent Office 3,263,437
Patented August 2, 1966

3,263,437
ABSORPTION REFRIGERATION SYSTEM CONTROL
David Aronson, Upper Montclair, N.J., assignor to Worthington Corporation, Harrison, N.J., a corporation of Delaware
Filed Jan. 17, 1964, Ser. No. 338,488
15 Claims. (Cl. 62—101)

This invention relates to an absorption refrigeration system of the type which circulates a saline solution. It refers in particular to means for controlling the capacity of the system in accordance with variations in loading conditions.

Absorption systems of the type contemplated possess many desirable operating and economic advantages. They are, for example, relatively simple in construction, and because of the need for but few moving parts, only minor maintenance is required. Economically, an absorption system or machine is particularly desirable where among the utilities available, combustible gas or steam are most accessible as a source of energy.

In a system of the type herein contemplated, a saline solution is circulated in varying concentrations of the solute, usually a salt such as lithium bromide, dissolved in water as the solvent. Water is the refrigerant which circulates in both liquid and vapor phase. The temperature and pressure of the system under certain conditions are such that the saline solution will tend to crystallize and plug or block passages such that the machine in effect becomes inoperable. Such an occurrence is prompted by circumstances in which the temperature of the solution drops below a predetermined point or else where the concentration of the solution is such that a particular temperature solid salt will be precipitated.

An absorption system like any controllable refrigeration system must be sensitive to changes in loading conditions and be adapted to modify its operating characteristics to accommodate such changes.

It is known in the prior art that part load operation is obtained by concentration control of solution being circulated in the system absorber which is effected basically by control of the rate at which refrigerant is driven from the liquid saline solution in the generator. In systems having steam heated generators there is often no control of the incoming flow of steam, the sole control being the conventional regulation of steam pressure such that the latter does not exceed a desired pressure. In the usual case of steam being supplied by a heating boiler, regulation is part of the operation of the boiler plant and not of the absorption refrigeration system. In absorption systems heated by means of hot water delivered to the generator, the flow of hot water may be controlled to give a set discharge temperature. In the instance of lithium bromide absorption refrigeration machines, this discharge hot water temperature is on the order of about 240° F.

To facilitate the present description, it is assumed that the source of heat supplied to the generator is at constant temperature. Such an assumption is relatively close to actual practice in the case of steam heated systems. In practical systems, control at part load is effected, among other ways, by varying the flow of weak solution circulating from the absorber to the generator and back to the absorber. The less the flow of weak solution to the generator, the less will be the quantity of refrigerant driven from the saline solution, although the relationship is not in practice proportional.

In order to attain good operating economy at part load it is necessary that the quantity of heat supplied to the machine be reduced essentially proportional to load. This reduction in rate of heat addition can be achieved by a reduction in the driving force represented by the temperature difference between the heat source and the brine solution being heated. Since the source is at constant temperature, the reduction in temperature difference is effected by raising the temperature of the brine solution. This occurs inherently as the concentration of dissolved salt in the brine is increased. From this standpoint then an increase in brine concentration is desirable and makes possible good heat efficiency at part load. However, it is known that at higher concentrations of dissolved salt in the brine, the solution tends to crystallize in the heat exchanger as it becomes cooled.

The system provided by the present invention affords a simple effective way to vary the capacity of an absorption refrigeration unit, and to avoid the undesirable possibility of solution crystallization within the system at low temperature. The disclosed arrangement is further advantageous in that it assures accurate control and economical operation over a wide range.

It is therefore an object of the invention to provide an improved absorption device having high performance characteristics and which may be readily adapted or controlled to meet changing loading conditions.

It is a further object to provide an absorption machine of the type described which is particularly adapted to avoid crystallization or solidification of solution circulated within the system.

It is a still further object of the invention to provide an absorption system having pump means circulating a liquid supply of saline solution at a substantially constant rate of flow to the absorber but of varying concentrations in accordance with the cooling load.

Another object is to provide an absorption refrigeration apparatus circulating a salt solution, the capacity of said apparatus being readily controlled at partial load conditions while avoiding precipitation of salt during all phases of operation.

A still further objective is to provide means in an absorption refrigeration device, for controlling capacity of the system. Said means being adapted to divert weak solution from the absorber to the generator for concentration in the latter. Another flow of weak solution is regulated for addition to concentrated solution leaving the generator. Said addition functioning to:

(a) Vary the strength of solution being recirculated to the absorber and, (b) Avoid precipitation of salt in the system heat exchanger at low load conditions.

Other objects of the invention not specifically delineated will become clear to one skilled in the art from the accompanying description made with reference to the illustrated apparatus.

In achieving these and other objectives not particularly mentioned, there is provided a closed absorption system including a generator, a condenser, an evaporator and an absorber operable at pressure below atmospheric and having a circuit, including a heat exchanger connecting the absorber and generator to pass brine solution therebetween. The system includes an arrangement of elements whereby a substantially constant flow of solution in varying degrees of concentration is directed to the absorber to be sprayed against liquid carrying heat exchange tubes.

The solution stream passed to the absorber is varied in concentration in response to a variation in the cooling load imposed on the system. At higher cooling loads, a more concentrated solution is formed. With a decrease in load, the solution stream is automatically adjusted to provide a liquid of lesser concentration of solute sprayed into the absorber.

At lower loads, concentrated solution passing through the heat exchanger is diluted by mixing therewith less concentrated solution in a sufficient amount to maintain the mixture above the crystallization point.

In the accompanying description, the term diluent refers to weak solution which is added to and mixed with hot concentrated solution prior to the latter entering the system heat exchanger.

The term flow spoilage hereinafter used, refers to the addition of weak solution from the absorber, to a stream carrying concentrated solution from the heat exchanger to the absorber, in the circuit where concentrated solution discharge from the system heat exchanger.

This method of system control is disclosed in the copending application of M. Rohr, entitled Capacity Control for Absorption Refrigeration System, Serial No. 346,774, filed February 24, 1964, now Patent No. 3,225,556, granted December 28, 1965.

According to the invention, a first flow of solution in the system is regulated to provide the proper amount of concentrated solution required at the absorber. This flow, as previously mentioned, is variable in accordance with the cooling load imposed on the system. Concurrent with this first flow control, weak solution is intermixed with hot concentrated solution at the generator down stream side. Thus, dilution of hot concentrated solution avoids crystallization in the heat exchanger at solution temperatures which would ordinarily cause precipitation of salt from the concentrated solution.

Figure 1:
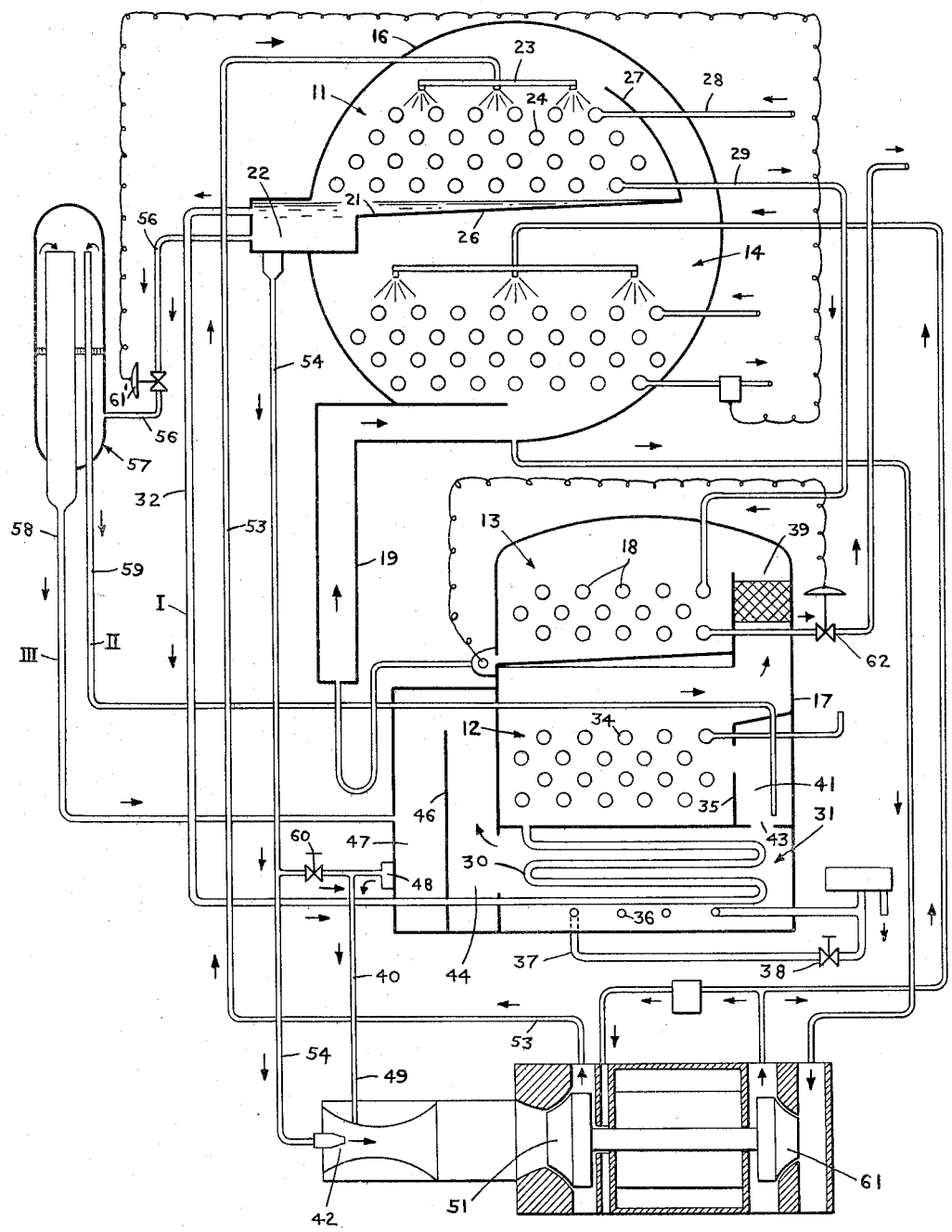
FIGURE 1 is a diagrammatic illustration of an embodiment of the present absorption system.

According to another form of the invention and as shown in FIGURE 1, solution dilution is effected under all but full load conditions. Its effect on concentration is zero at full load; then increases as the load decreases. With corresponding decrease in strong solution flow out of the generator, the net effect is to make this dilution increasingly more significant. This novel form of flow control to the generator, and flow control of diluent weak solution, is achieved by providing a plurality of lines carrying weak solution from the absorber.

At least one line carries a first stream of weak solution to the generator for solution concentration. A second stream is conducted from the absorber and mixed with the first stream to dilute the latter after said first stream has passed through the generator and has been concentrated.

A third stream is directed from the absorber to mix with the combined first and second streams downstream of the generator and heat exchanger, to limit the flow rate of the first stream. By virtue of the characteristics of the system pumping means, the total of the flow of the first, second and third streams remains substantially constant over the entire range of operation. Regulation of the flow of the third stream will thus inherently cause a responding variation in flow of one or both of the other streams.

Flow rates of the second and third streams respectively are maintained in either essentially constant, or in a varying proportion, one to the other by means of the proportioning arrangement to be hereinafter described. The several methods of varying the flow rate of the second and third streams, one with respect to the other, all lead to a dilution effect of the stream leaving the generator so that crystallization of strong solution in the heat exchanger is avoided despite the tendency of the generator to discharge higher concentration solution at lighter loads than at full loads. As the solution becomes diluted it remains liquid even after being cooled in the heat exchanger.

In the foregoing and following description, the term solution is used to designate a liquid made up of absorbent and refrigerant being passed through the system, in contrast to the refrigerant stream which operates in both the liquid and vapor phase. The solution, however, although being in the liquid phase is nonetheless subject to changes in concentration to meet any changes in load normally sensed at the system evaporator which circulates chilled water at outlet temperatures between about 40 and 50°.

The terminology weak solution herein referred to defines a condition of the solution in which there is a preponderance of refrigerant so that functionally the solution is weak in absorbing properties. The term strong solution on the other hand defines the solution condition where there is a lesser amount of refrigerant so that the solution possesses greater absorption properties.

FIGURE 1 generally illustrates an absorption system of the type contemplated embodying one form of flow control in which a stream of weak solution leaving the absorber is split into a plurality of streams. This system includes basic components including an absorber 11, a generator 12, a condenser 13, an evaporator 14 and a heat exchanger interconnected by suitable piping, pumping and associated control means to define a compact apparatus. The individual elements as taught by the prior art may be interconnected into a single compact package or alternatively they may be interconnected and physically disposed as separate units. As a matter of practicality and to provide a commercially saleable device, the elements are preferably so arranged and spaced as to take up as little volume as possible for the amount of refrigeration produced.

As presently shown, absorber 11 and evaporator 14 are disposed within a low pressure shell enclosure 16 whereby water or refrigerant vapor flows upwardly to the absorber 11 to be connected by sprayed streams of brine solution. Generator 12 and condenser 13 are positioned in a high pressure shell enclosure 17 and relatively disposed with respect to each other to pass vaporized refrigerant to the condenser for contacting water circulating coils 18. In generator 12 refrigerant is boiled from weak brine solution to concentrate the latter. Released vapor passes upward and is condensed in the indirectly cooled condenser located in the high pressure shell. Refrigerant condensate is then pumped or forced upward from the high pressure shell 17 through conduit 19 to evaporator 14 in which at least a portion of the condensate flashes.

Figure 2:
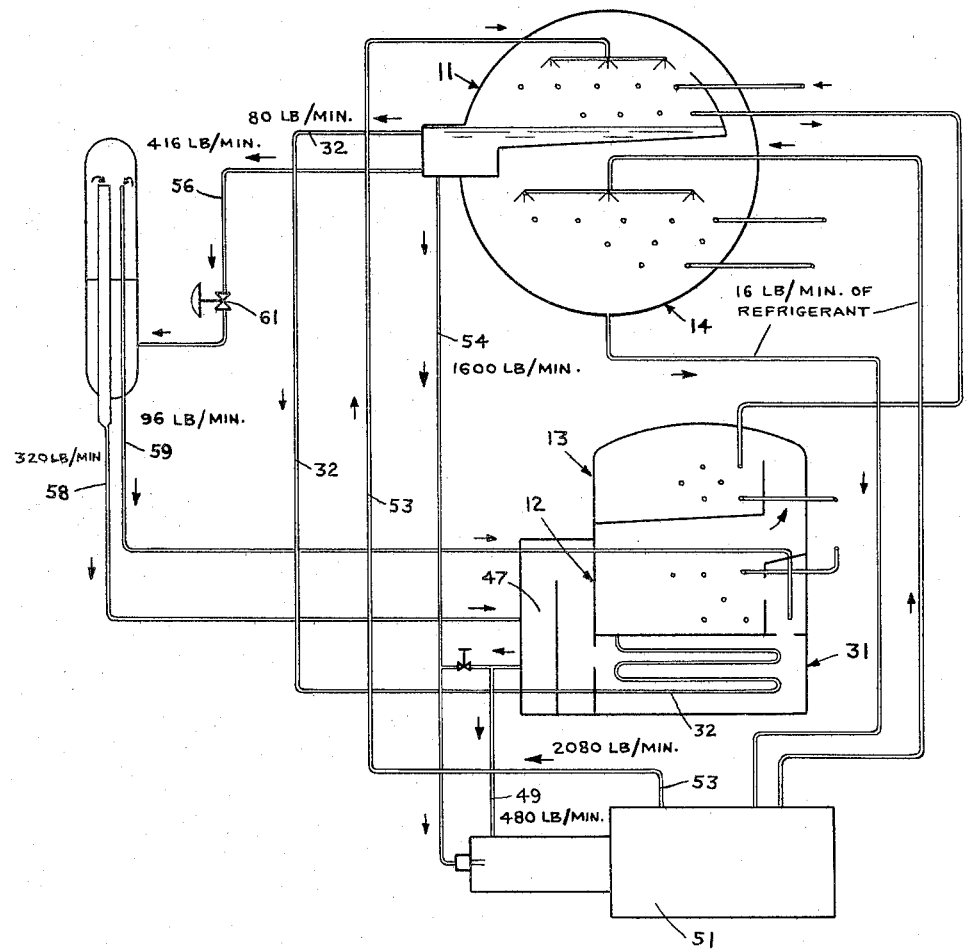
FIGURE 2 is a flow diagram of the system shown in FIGURE 1.

FIGURES 1 and 2 show one embodiment of the invention. Weak solution is gravity fed from sump pan 22 in absorber 11 by way of line 32 to generator 12 for concentrating the solution. This flow to the generator varies in concentration between about 55% and 61%. The volume of solution is adjusted, however, depending on the head of liquid established in pan 21 as required to hold the concentration of absorbent to that value necessary to meet the cooling load imposed on the system.

Under normal operating conditions weak solution enters generator 12 at a concentration of from about 55% to 61% and leaves at about 66% to 69% concentration. Absorber 11 includes spray trees or nozzles 23 directing sprays of solution against the bundle 24 to form a pool of solution in sump 22 and sump pan 21 in the above mentioned concentrations. It is further understood that in determining these concentrations the solution may also contain rust inhibitor and/or wetting agent in sufficiently small amount to not alter concentrations. It should be understood that any salt dissolved in the refrigerant is present only as contaminant and diminishes performance. Systems may nevertheless be designed to use a very weak brine to avoid freezing but for a normal air conditioning application this does not apply.

Condenser 13 and evaporator 14 define portions of the system holding essentially pure refrigerant.

Structurally, the machine embodying the present absorption system includes an elongated upper shell 16 supported by legs or other means not shown, fixed to the underside. The shell is preferably of unitary welded construction horizontally disposed and having end plates including removable access openings defining a substantially airtight inner enclosure. Shell 16 includes upper and lower sections separated by a partition 26 welded or fastened by other means along the end and sides of the shell inner wall and shaped to form the sump 22 and sump pan 21.

Solution and refrigerant pumps 61 and 51 may be supported on the shell outer surface or if of the hermetic type may be disposed within one of the shells in direct contact with the liquid being pumped.

Absorber 11 and evaporator 14 are positioned in the upper shell 16. The absorber includes the liquid holding tray-like pan 21 having upturned edge 27, the pan being positioned substantially horizontally of the shell extending the length thereof. Pan 21 includes the solution holding sump 22 having one edge adjacent the side of the inner wall of the shell. Edge 27 is faced inwardly of the shell forming a spray guard and vapor guide. Cooling coil or tube bundle 24 positioned above tray 21 is provided with an inlet 28 and outlet 29 for circulating water or other cooling fluid. This cooling medium is circulated to the condenser 13, then through a cooling tower not shown, and subsequently circulated back into the machine, by means of a pump, not shown.

Heat exchanger 31 having a coil 30, and which treats weak and strong liquids as they move through the system, is disposed at the lower side of the shell 17 in heat exchange contact with generator 12.

The liquid circulating portion of the system, including absorber 11, generator 12 and heat exchanger 31, embodies a plurality of lines carrying solution in such manner as to control operation of the system in accordance with the cooling load. In absorber sump 22 a varying amount of solution is collected after passing over tubes 24. A plurality of lines are communicated with sump 22 having the respective inlets there disposed at different levels of elevation with respect to each other to receive streams of solution under varying liquid heads.

A first line 32 connecting absorber sump 22 and the generator 12 passes solution from the sump pan 21 to the coil inlet side of the heat exchanger 31 such that weak solution in line 32 is preheated prior to being reconcentrated.

In generator 12 heating medium such as hot water or steam is directed tube bank 34 and after being circulated is passed into a secondary heat exchanger coil 36 so that steam condensate or cooled heating medium may heat outgoing strong solution and thus avoid the hazard of crystallization due to low temperature on shutdown of the system. A discharge line 37 communicated with the outlet of secondary coil 36 in heat exchanger 31 recirculates heating fluid or steam condensate to the boiler or energy source. Line 37 includes a valve 38 or other flow regulating means such as a steam trap controlling the passage of fluid through the line. Valve 38 is preferably automatically operable in response to a condition within the system to vary flow of condensate therethrough and may, for example, be actuated responsive to the temperature of condensate immediately upstream of the valve.

From generator 12, refrigerant in vapor form passes upwardly through passage 39 into condenser 13. Concentrated absorbent in generator 12 overflows wall 35 from the generator heating chamber into end compartment 41, and through opening 43 which is communicated with the shell side of heat exchanger 31. Thus hot solution at concentrations up to about 66% at full load passes into contact with cooling tubes therein. The strong, cooled solution discharges into a reservoir chamber 44 at the heat exchanger downstream side. This chamber is provided with an upwardly extending wall 46 having sufficient height to serve as a barrier and hold solution within the generator and heat exchanger in the event that maintenance should be required on the absorber pump 51.

Solution in chamber 44 overflows wall 46 to enter a second chamber 47 having an outlet 48 communicated through line 49 to the suction of absorber pump 51. This flow of strong solution combines upstream of pump 51 suction with the flow of weak solution in 54 from absorber 11. Means forming a flow restriction 42 is provided in line 54 to cause a drop in liquid pressure so that the pressure of weak solution entering pump 51 is substantially equal to the pressure of strong solution in line 49. Since the pressure established by this restriction 42 cannot be set exactly, a trim valve 60 is provided to effect adjustment so that at full load, the flow of solution is at the rate which gives highest capacity at the desired heat rate of a given heat input, per ton of refrigeration produced.

To provide the absorber with a substantially constant stream of saline solution at all times regardless of load conditions, the major portion of liquid circulating, is handled by the second line 54 disposed in the lower side of the sump at a lesser elevation than the first line 32 carrying solution from the absorber to the heat exchanger. The variation of solution head in the second line 54 is relatively small so that the flow through pump 51 remains relatively constant.

Normally, pump 51 will move a substantially constant flow of solution at all times. However, the concentration of solution being moved by the pump to the absorber spray trees will vary in concentration in accordance with the load imposed on the system. The proportioning of the weak and strong solution entering the absorber pump will be determined not by the amount of weak solution entering the pump from line 54 but rather by the amount of strong solution from weir chamber 44 thence to chamber 47 connected to the pump suction.

Although a substantially constant flow of solution through the absorber pump circuit is maintained, a second circuit carries weak refrigerant from the absorber in a controlled flow to vary passage of strong solution from the generator. The substantially constant nature of the flow of solution through the absorber pump circuit arises from the design which provides an essentially constant resistance in the form of the nozzles mounted in the spray trees 23, and the characteristics of circulating pump 51 which has an essentially constant discharge head. Hence these relationships hold:

Flow to pump suction=Flow discharged to spray nozzles (constant flow rate)

Flow to pump suction=Flow 54+flow 49=constant but
Flow 54=constant (as set by restriction 42)
thus
Flow 49=constant
and
Flow 49=flow 58+flow 30=constant so that as flow 58 increases, flow 30 will decrease by an equal amount, and the sum of the two thus remain constant.

Referring to FIGURE 1, the second circuit carrying weak solution includes a third line 56 having an inlet communicated with sump 22 at an elevation above the inlet of second line 54 and below the inlet of the first line 32. Weak solution in the sump 22 is carried through line 56 to a vapor tight receiver 57 holding a supply of the solution. Receiver 57 includes a plurality of conduits 58 and 59 positioned with inlet openings above the lower surface of the receiver to maintain a minimum liquid level therein. Conduits 58 and 59 are sufficiently large in cross-sectional area and are provided with openings of sufficient diameter to receive overflowed weak solution in accordance with the liquid head built up in receiver 57.

Valve means 61' positioned in the third line 56 is operable to control flow of weak solution to the receiver. The function of this valve will be described hereinafter more fully in the subsequent description of the operation of this embodiment of the apparatus.

Figure 3:
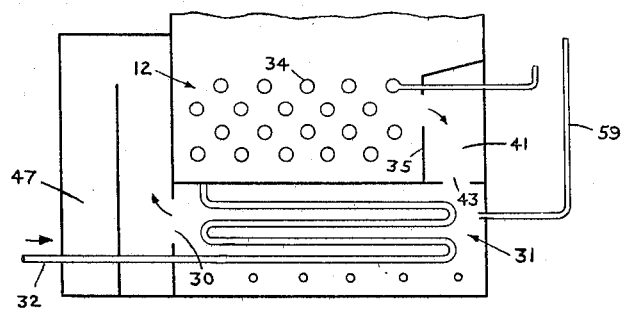
FIGURE 3 is a segmentary view illustrating an alternate embodiment of the system in FIGURE 1.

Conduit 59 receives at its upper end a stream of weak solution from receiver 57 and is connected to introduce weak solution intermediate generator 12 and the shell side of the heat exchanger 31. Conduit 59 may feed directly into the generator downstream side at chamber 41 to cause mixing of cool, weak solution from receiver 57 with hot concentrated solution passing from the generator. Alternately, as shown in FIGURE 3, conduit 59 may feed directly into the heat exchanger 31 shell side similarly effecting mixing of the solutions.

The second conduit 58 also communicated with receiver 57 directs an overflow stream of weak solution from the latter to the lower section of weir chamber 47 communicated with chamber 44 holding a supply of cooled concentrated or intermediate strength solution at a temperature less than generator temperature. Conduit 58 carries a flow of weak solution having a liquid head sufficient to overcome the generator pressure such that the mixture of weak and strong solution within chamber 47 will be dependent at least in part on the head carried in conduit 58. The effect of this secondary injection of weak solution into chamber 47 tends to spoil the regeneration operation by reducing flow from the generator at low loads.

A limited degree of concentration regulation, and dilution could be achieved by admitting weak solution separately to either weir chamber 47 or flow passage 41. Such single zone mixing however requires close control to prevent unbalancing the system. For example, excessive dilution at generator weir chamber 41 would adversely affect the thermal efficiency of the system due to mixing of excessive, cold weak solution with hot strong solution which unduly cools the hot return to heat exchanger 31. Admission of weak solution at weir chamber 47 on the other hand, fails to provide the dilution required upstream of the heat exchanger to avoid crystallization of strong solution. The combination of simultaneous dilution at two separate zones as presently taught, results in good thermal efficiency of the system and freedom from crystallization.

Figure 8:
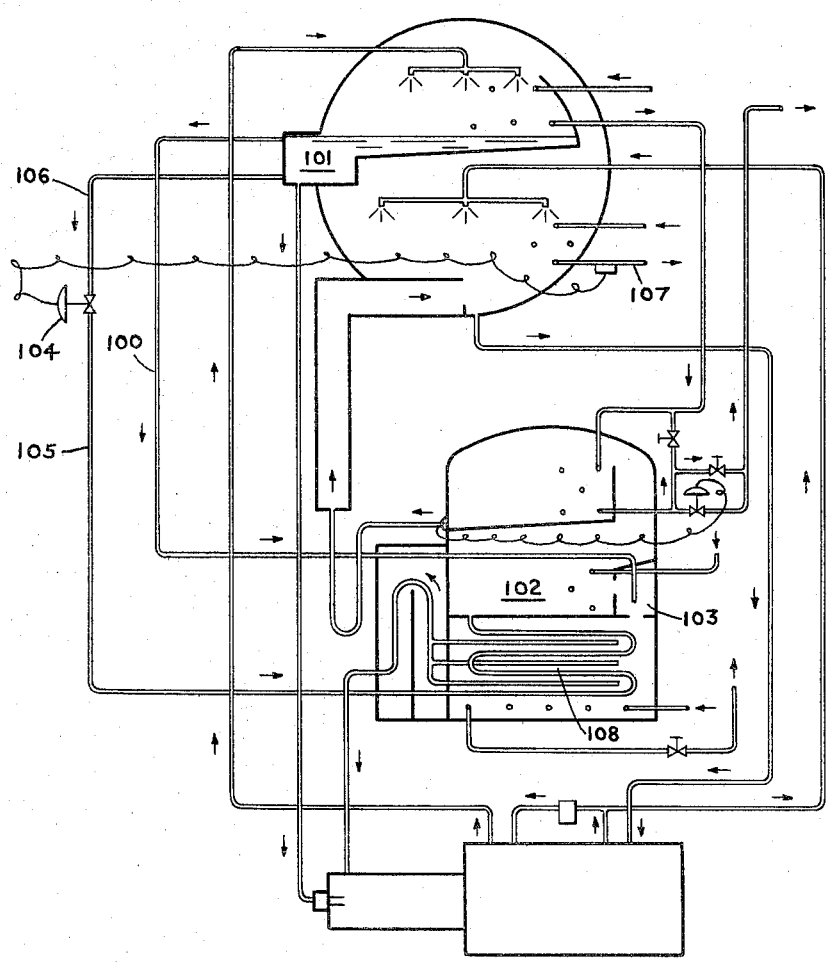
FIGURE 8 is a flow diagram of another embodiment of the present absorption system.
Figure 9:
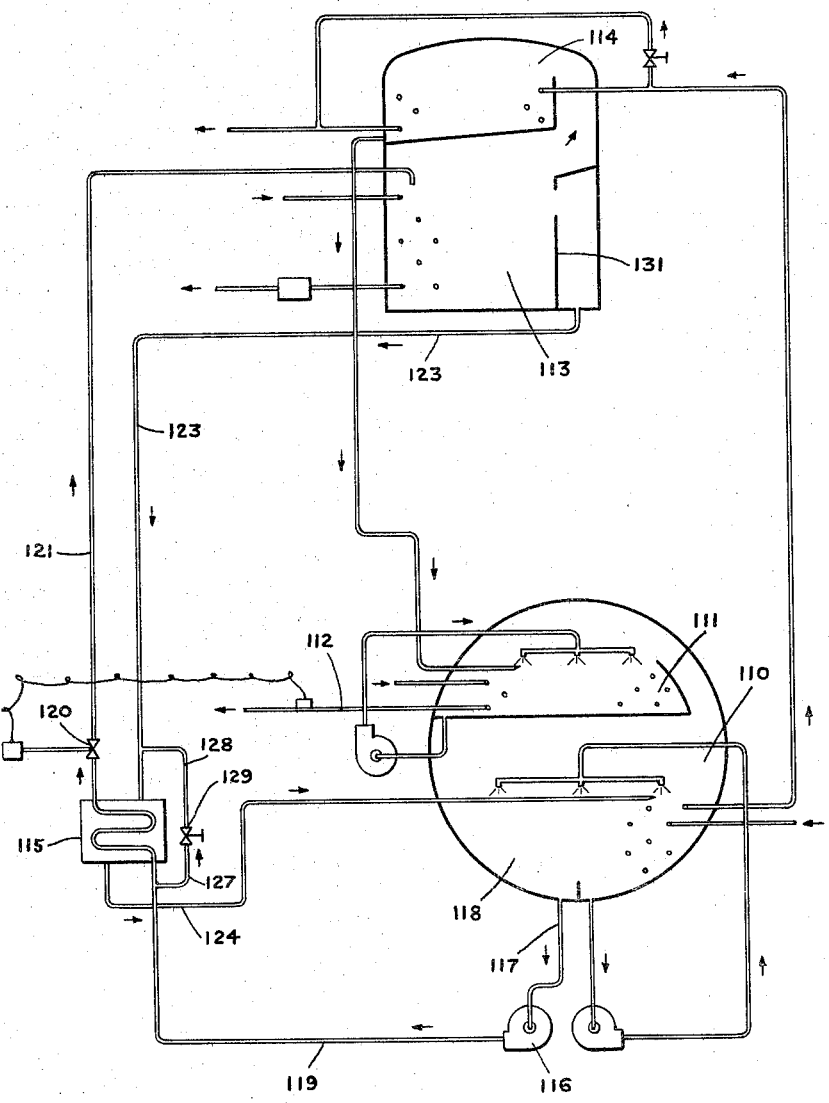
FIGURE 9 is a flow diagram illustrating the present invention as incorporated into an apparatus having a reversed physical arrangement from the system shown in FIGURE 1.

FIGURES 8 and 9 illustrate alternate embodiments of the disclosed system in which dilution of strong solution between the generator discharge and the heat exchanger discharge, is achieved by imparting weak solution. In FIGURE 8, overall flow control is effected by actuation of a valve positioned in the line connecting the absorber and the generator for passing a stream of weak solution from the absorber to be concentrated in the generator.

FIGURES 8 and 9 are basically similar to FIGURE 1 with the exception of the flow control means connected to the absorber and adapted to regulate solution flow. In FIGURE 1, flow control is achieved by dividing the weak solution flow into at least two separate streams. In FIGURE 8, dilution of strong solution leaving the generator is by way of line 100 connected directly to the absorber sump 101.

Referring again to FIGURE 8, weak solution in line 100 is directed to generator 102 discharge chamber 103, for mixing with strong solution. The inlet of line 100, as shown is disposed at the sump 101 upper edge such that solution feed to generator 102 is dependent in part upon the head of liquid stored in sump 101.

Flow control through the system is by way of valve 104 connected into lines 105 and 106, the latter having an inlet at the lower part of sump 101 to receive a stream of weak solution at virtually all load conditions. Valve 104 is preferably automatically adjustable, and as presently illustrated is operable in response to conditions of the cooled media in line 107.

Thus in accordance with the temperature of chilled water in line 107, the setting of valve 104 is varied to regulate the flow rate of solution passing to the generator 102 by way of heat exchanger 100, for reconcentration.

As the cooling load on the system increases, valve 104 will open to increase solution flow to the generator. Conversely, as load condition decreases, flow through valve 104 will be decreased. Under the reduced load conditions, concentrated solution leaving the generator would ordinarily tend to crystallize. However, the diluting flow by way of line 100, which flows becomes operative at part load on increase in level in sump 101, decreases the concentration of solution in the heat exchanger 103 thus maintaining the solution below crystallization concentration.

FIGURE 9 schematically illustrates an embodiment of the invention showing a system in which the relative disposition of absorber and generator are such as to require solution from the absorber to be pumped to the generator, because the unit comprising generator and condenser is disposed above the unit comprising absorber and chiller.

Referring to FIGURE 9, the system includes an absorber 110, an evaporator or chiller 111 having a chilled water line 112. Generator 113 is located in the lower portion of the uppermost part of the unit comprising generator 113 and condenser 114. A shell and tube type heat exchanger 115 is connected to the system passing weak and strong solution in heat exchange contact. The suction of pump 116 is connected through line 117 to the absorber sump 118. Line 119 connected to the discharge of pump 116 carries weak solution to the tube side inlet of heat exchanger 115 and thence through valve 120 and line 121 to the generator 113.

Hot concentrated solution leaving generator 113 is directed through line 123 to heat exchanger 115 shell side. Line 124 then carries heat exchanged solution in mixture, for introduction to absorber 110. The rate of flow of weak solution to generator 113 is regulated in response to load by means of control valve 120 which has sensing means on chilled water discharge pipe 112. Return stream of strong solution by means of co-acting weir 131 and valve 120 varies in rate in some proportion to load.

A bypass around the weak solution side of the heat exchanger 115 and around the generator 113 is provided by means which includes lines 127 and 128 connected to lines 119 and 123 respectively.

A bleed valve 129 admits solution flow through 127 and 128 for the purpose of diluting hot solution entering the heat exchanger 115 shell side to avoid crystallization of solution in the latter at part load conditions.

Control of the system

The following description related to control of the system is applicable to any embodiment thereof wherein the feature of solution dilution is employed. For the present purpose however, reference is made particularly to the embodiment shown in FIGURES 1 and 2.

Operationally, at any reduced load, some saline solution will flow in line 58 by reason of valve 61' opening in response to the load decrease. This weak solution flow will reduce the flow of strong solution into chamber 47 of the heat exchanger by an equal amount. This in turn causes a similar reduction in flow to the generator from the absorber through line 32. Whether a flow develops in line 58 or in line 54, the solution flow is recycled directly back to the absorber and does not enter the generator.

Likewise, line 59 carries weak solution to the downstream side of the generator, which solution after passing through heat exchanger 31 is pumped back into the absorber. Thus the flow in line 53 also does not contribute to flow into and out of the generator.

The net result is that increase in flow through valve 61' reduces flow out of the generator 12 at partition 35 and the flow into the generator 12 through line 32 and the tube side of the heat exchanger. Weak solution flow through line 32 is slightly greater than the concentrated flow out of the generator by the amount of water picked up in the absorber, or conversely by the amount of water liberated from solution being concentrated in the generator.

Basic control of the system is affected by regulation of the rate of flow of weak solution from absorber 11 to the generator 12, which establishes a concurrent equal flow of strong solution leaving the generator for mixing with solution being cycled through the absorber. A reduced rate of flow of weak solution to the generator 12 will lead to an increase in concentration of solution in the generator with a corresponding increase in temperature of strong solution. This imbalance results in a corresponding decrease in the temperature difference available for transferring heat from the condensing steam to the boiling brine. Thus, automatically the rate of heat addition to the system is reduced. It is appreciated however that this sequence of steps may be altered by the presence of some additional form of heating medium control to the generator.

The increased concentration of strong solution leaving the generator at part load is adjusted after solution leaves the generator, this adjustment is effected by addition of weak solution to mix with the strong solution prior to complete passage of the latter through the heat exchanger 31. Such dilution may be at a fixed or varying rate and may take place at all load conditions or only upon reduction of load to a certain fraction of full load.

Again referring to FIGURE 1, in accordance with the present invention dilution of concentrated solution discharged from the generator 12 is only varied as a result of the operation of valve 61' which simultaneously regulates rate of flow of weak solution from the absorber 11 into the generator 12. Valve 61' is responsive to the temperature of chilled water leaving the system and so serves to adjust machine conditions in accordance with variations in load, and with requirements of particular operating temperature of chilled water at the evaporator 14.

Condenser head pressure control

Again referring to FIGURE 1, the basic control of the system is augmented through control of the head pressure in condenser 13 by means of valve 62 responsive to the temperature of refrigerant condensate formed in condenser 13. As shown in FIGURE 1, valve 62 is placed in a pipe or conduit discharging cooling water from condenser 13. However, regulation of cooling medium flow could be achieved by placing valve 62 anywhere in the cooling water circuit such as in line 28 and 29. Also, such control of flow through absorber cooling coil 24 and condenser cooling coil 18 could be achieved by means of flow bypass or a flow diverting valve as is common in the art.

Condenser head pressure control serves to regulate the flow of cooling water primarily in response to load conditions, but also as cooling requirements may be affected by increase or decrease in ambient condtions. The latter are reflected in temperature changes of cooling water passing through the cooling tower. Such variation in the rate of flow of cooling water is common practice in many forms of apparatus in which heat must be rejected to some external sink by means of a liquid coolant.

Such flow control can avoid the need for regulation of the temperature of the coolant fluid, and permits additional economies in pumping since with a lower temperature coolant or at a lower head condition, the flow rate of coolant may be reduced.

As presently shown, control of condenser coolant flow rate is adjusted solely in response to temperature which, for a saturated pure vapor condensing to liquid, is equivalent to the corresponding vapor pressure. The operation of valve 62 is responsive to cooling water temperature and to the rate of steam libartion in the generator, and is thus only indirectly responsive to load conditions.

Preferred control arrangement

Referring to FIGURES 1 and 2 which represent a preferred embodiment of the invention, control valve 61' operates in response directly to changed load conditions. For example, at low load conditions, where concentration of absorbent sprayed into the absorber is greater than required for the load, the extra cooling resulting from excessive lowering of the vapor pressure and temperature in the evaporator will be sensed as a decrease in the temperature of chilled water leaving the evaporator. This decrease in evaporator temperature or leaving chilled water temperature can be detected by any of several devices and arrangements adapted for the purpose together with suitable control means associated therewith to actuate the flow control valve.

At low loads a decrease in chilled water temperature will cause valve 61' in line 56 to open thus increasing the flow of weak solution through line 56 into receiver 57. Solution flow from receiver 57 through line 58 into weir chamber 47 reduces the flow of strong solution from the generator 12 by an equal amount. Flow through line 58 correspondingly reduces the flow of weak solution to the generator 12 as required to reduce the capacity of the machine and simultaneously to maintain good thermal efficiency.

With a load increase, the rise in temperature of chilled water at evaporator will be detected and cause valve 61 to close, thereby throttling flow of weak solution leaving the absorber at line 56. In a reverse manner with less loads the flow of weak solution from the absorber 11, to generator 12 will decrease thus decreasing the rate of regeneration of weak solution and decreasing the refrigerating capability of the system.

Under theoretically full load conditions, valve 61 is completely closed, thus flow of solution from sump 22 is through lines 32 and 54 only.

Part load operations

FIGURE 2 illustrates an intermediate load condition showing the relative flow rate of solution in the various sections of the system. Numerical designations adjacent respective liquid carrying lines indicate the rate of flow through the line in pounds per minute.

The overall flow to absorber spray nozzles is approximately 2080 pounds per minute. Of this amount weak solution from the absorber sump at the rate of 1600 pounds per minute will constitute the major portion. Line 32, operating on a low head of solution contained in the absorber, passes approximately 80 pounds per minute into the heat exchanger coil side for reconcentration. This flow after being regenerated passes through the shell side of the heat exchanger and into weir chamber 47.

The variable control element of the system carries a flow of about 416 pounds per minute through line 56 and past valve 61 prior to entering receiver 57. Overflow from the receiver into lines 58 and 59 respectively provides solution flows of 320 and 96 pounds per minute. This flow differential under equal pressure heads is achieved either through conduit 58 being larger and having a greater capacity than 59 or by constricting the later to minimize flow therethrough.

A lesser flow of weak solution in line 59 is directed to the downstream side of the generator for mixing with strong solution entering heat exchanger 31. The larger flow from receiver 57 in line 58 is introduced to overflow chamber 47 for mixing with the intermediate concentration solution leaving the heat exchanger.

To summarize, it is seen that the flow of liquid from pump 51 through line 53, although constituting 2,080 pounds per minute, carries a major portion of weak solution into which has been mixed a minor amount of solution from generator 12 to which has been added larger amounts of weak solution from lines 58 and 59. This altering of weak solution flowing from absorber to the absorber spray nozzles provides a relatively even intermixing of weak and strong solution. Further, the system as a whole, is more susceptible to change in loading conditions at the chiller output, without any further penalty imposed by the addition of operating equipment such as pumps, valves, etc.

Primarily, at decreased loads, flow of concentrated solution from the generator is reduced. Concomitantly, however, by diluting strong solution entering the heat exchanger, crystallization of solution is eliminated or substantially reduced.

*Alternate flow control system*

The control system as described, operates with the flow divided into two streams in an essentially constant proportion. This arrangement will afford stable operation with good economy over a wide range of loads. It tends however to depart from the ideal conditions at either high load or extremely light load. It is thus advantageous, to have the flow division at light load such that a smaller proportion of solution goes to the diluent stream and a larger proportion to the flow spoilage stream, than at heavier loads. This is accomplished by means of suitably characterized weirs as it common practice in the art of operating distillation columns where a split between product and reflux is to be varied in different proportions depending on rate of output.

Such weirs however, require considerable care in their manufacture. A relatively simple design which achieves the desired change in split proportions is one which uses a small diameter vertical pipe for the diluent stream and a considerably larger diameter vertical pipe for the flow spoilage stream. The resulting flows through both pipes then follows the behaviour of open weirs. As weak solution flow increases, flow to the small pipe is no longer restricted as an open weir, but rather as an orifice passing a flow proportional to the 1/2 power of the height above the pipe opening. The flow to the larger pipe still is established on the basis of weir type flow which varies as the 3/2 power of the height of liquid above the opening. Accordingly, flow to the spoilage stream increases at a faster rate than the flow to the diluent stream.

Figure 4:
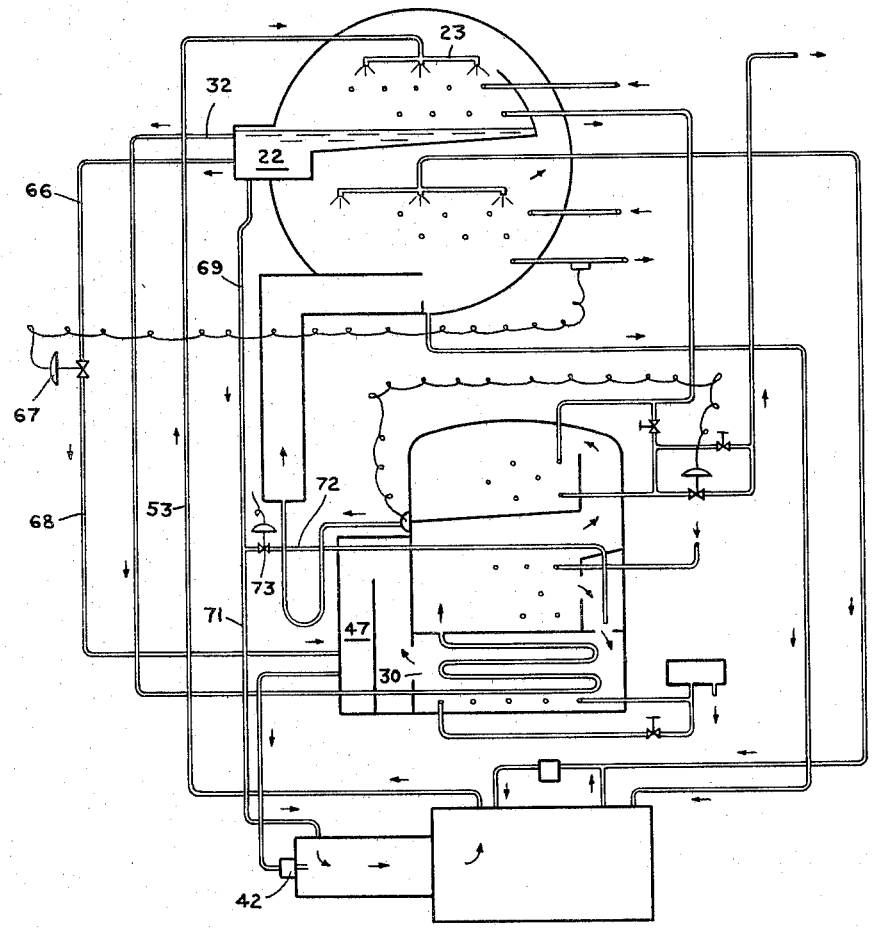
FIGURE 4 is a diagrammatic illustration of an alternate embodiment of the absorption system shown in FIGURE 1.

FIGURE 4 illustrates another embodiment of the flow regulating system previously described with respect to FIGURES 1 and 2. The following arrangement is similar to the basic system shown in FIGURES 1 and 2, with the noted exception of the means for regulating flow of weak solution for purpose of dilution of strong solution between generator discharge and heat exchanger discharge.

As shown in FIGURE 4, line 69 is connected to absorber sump 22, feeding a stream of weak solution to be mixed with concentrated solution, returned to the absorber and sprayed across tubes contained therein.

A line 66 is also connected to sump 22, but at an elevation slightly higher than line 69. Line 66 includes control valve 67 which is operable in response to the temperature of chilled water at the evaporator outlet. Valve 67 opens on decrease of temperature below the set point and closed on increase above the set point. Line 68 receives weak solution from valve 67 downstream side and connects to chamber 47. Weak solution flow from the absorber is thus varied in response to changing load conditions. Such flow control results in a corresponding flow change of reconcentrated solution entering chamber 47. In the reverse sense, flow increase in line 68 serves to reduce the flow of reconcentrated solution to chamber 47 by an equal amount. Such change in outflow of reconcentrated solution thus serves to change the concentration of the final mixture produced by the addition of reconcentrated solution to the recirculated weak or intermediate strength solution flowing to and from the absorber.

Line 32 is connected to sump 22, but at an elevation higher than line 66. Line 32 carries weak solution from the absorber 11 to the weak solution side of heat exchanger 31 for preheating therein prior to entrance into generator 12 for reconcentration. As flow of reconcentrated solution out of generator 12 and heat exchanger 31 through passage 30 to chamber 47 is reduced, the level of solution in absorber sump 22 drops until the outflow of weak solution balances return flow of strong solution from passage 30 into chamber 47 and thence into line 48 for mixing with weak solution flowing from lines 69 and 71.

Referring to FIGURE 4 line 69 connected to sump 22 joins with line 71 to carry weak solution to the inlet of the solution mixing element 42.

Line 72, including valve 73, connects into line 69 for diverting a portion of the weak solution. The diverted stream is carried through line 72 to the downstream side of the generator for intermixing with, and diluting strong solution prior to entrance of the latter into heat exchanger 31 to prevent crystallization. It is understood however that dilution may be effected in the course of passage of strong solution through heat exchanger 31. As described previously, the reduction in flow of solution through the generator for reconcentration leads to an increase in the proportion of salt dissolved in the brine, which would lead to crystallization as the solution is cooled down. Thus at part loads, when such reduction in flow is effected by operation of valve 67, the strong discharge solution is diluted effectively by the constant rate of flow of weak solution from line 72.

Again referring to FIGURE 4 at high loads the dilution effect is moderate because the dilution stream is then but a small fraction of the flow leaving the generator. Nevertheless, this constant bypass of weak solution from the generator represents a real loss of capacity of the generator at full load. In order to avoid this loss, valve 73 may be controlled by a diaphragm operator, a solenoid, or other device so that it remains closed at full load and only opens when the load has dropped to some extent from the maximum. The same motive force used to actuate valve 67 may be used to actuate valve 73.

Figure 5:
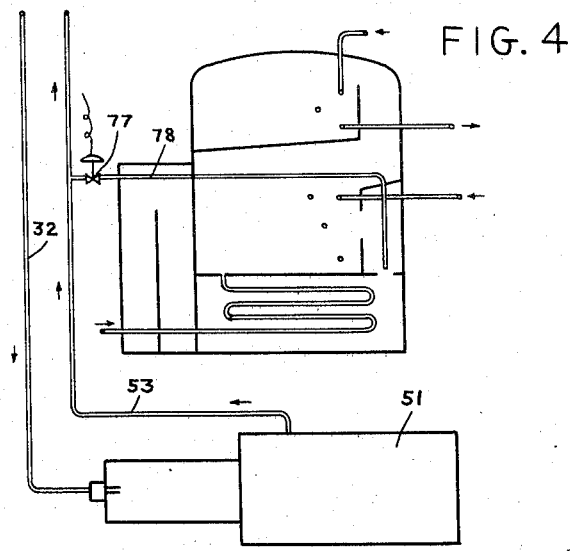
FIGURE 5 is a segmentary view of a portion of a modification of the system shown in FIGURE 4.

FIGURE 5 illustrates a still further embodiment of the dilution feature of the invention. Here at partial load intermediate strength solution from pump 51 is introduced to the heat exchanger for mixture with and dilution of strong solution. The diluting stream is carried from line 53 to valve 77 and line 78, thence to the heat exchanger inlet. As in the arrangement shown in FIGURE 4, item 77 may be a fixed restriction, of any suitable design, or may be varied responsive to a signal sent to said valve 77.

The foregoing arrangement of FIGURES 4 and 5 represent simplicity of design and fabrication, they do however introduce a slight loss in capacity of the generator and heat exchanger at full load, or from the added complexity of means for controlling the restriction of valve 73 or 77. A still further arrangement which avoids this loss is shown in FIGURE 6 which represents another embodiment of the control system and components as applied to the apparatus shown generally in FIGURES 1 and 2.

Figure 6:
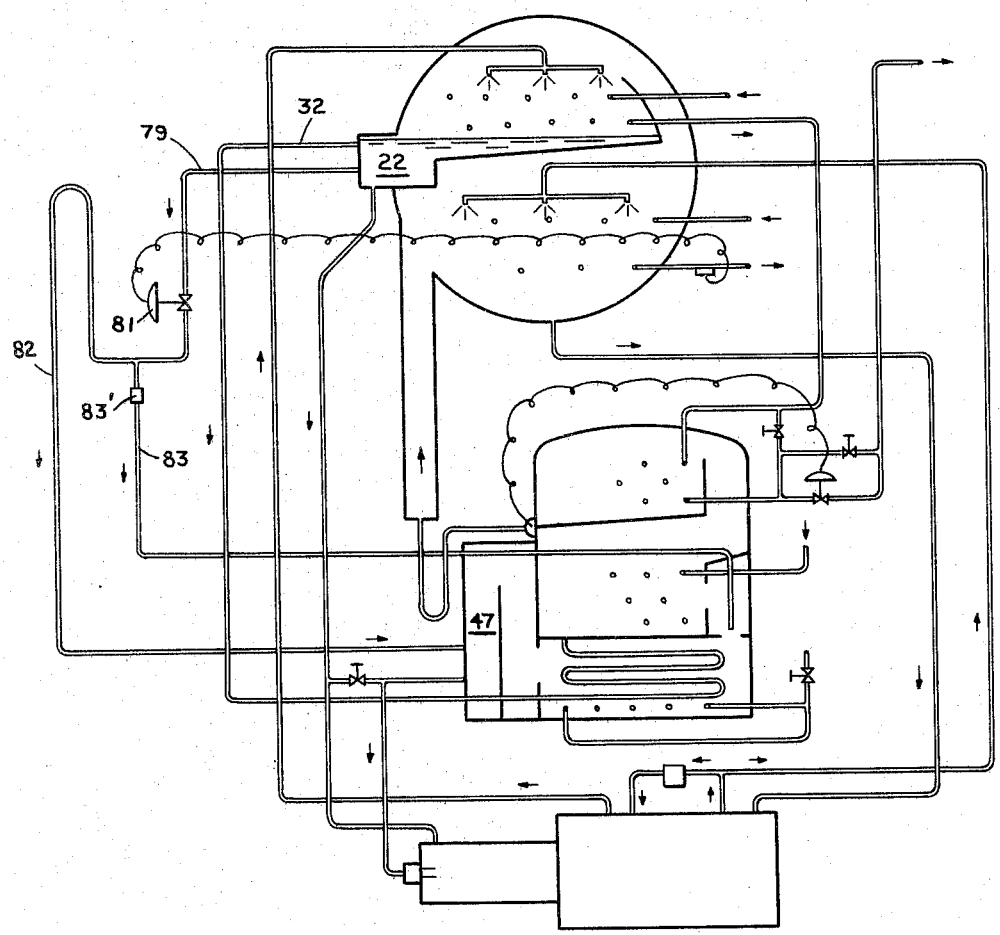
FIGURE 6 is a diagrammatic illustration of another modification of the absorption system shown generally in FIGURE 1.

Referring to FIGURE 6, absorber sump 22 is connected by line 79 to control valve 81. Line 79 is upwardly looped or otherwise formed to maintain a desired liquid head. Line 82 disposed downstream of valve 81, carries weak solution in varying amounts to chamber 47. Similar to the previously described arrangement, valve 81 is responsive to changes in temperature at the evaporator outlet, for adjusting capacity of the system in accordance with the temperature of chilled water. Line 83 connected downstream of valve 81 includes an orifice, valve, plug, or similar restriction 83' establishing the flow of diluent weak solution to the downstream side of the generator in the manner previously described. Said restriction may be adjusted or preset to match particular operating conditions, but it is intended to operate for extended periods of time without change as load changes.

Figure 7:
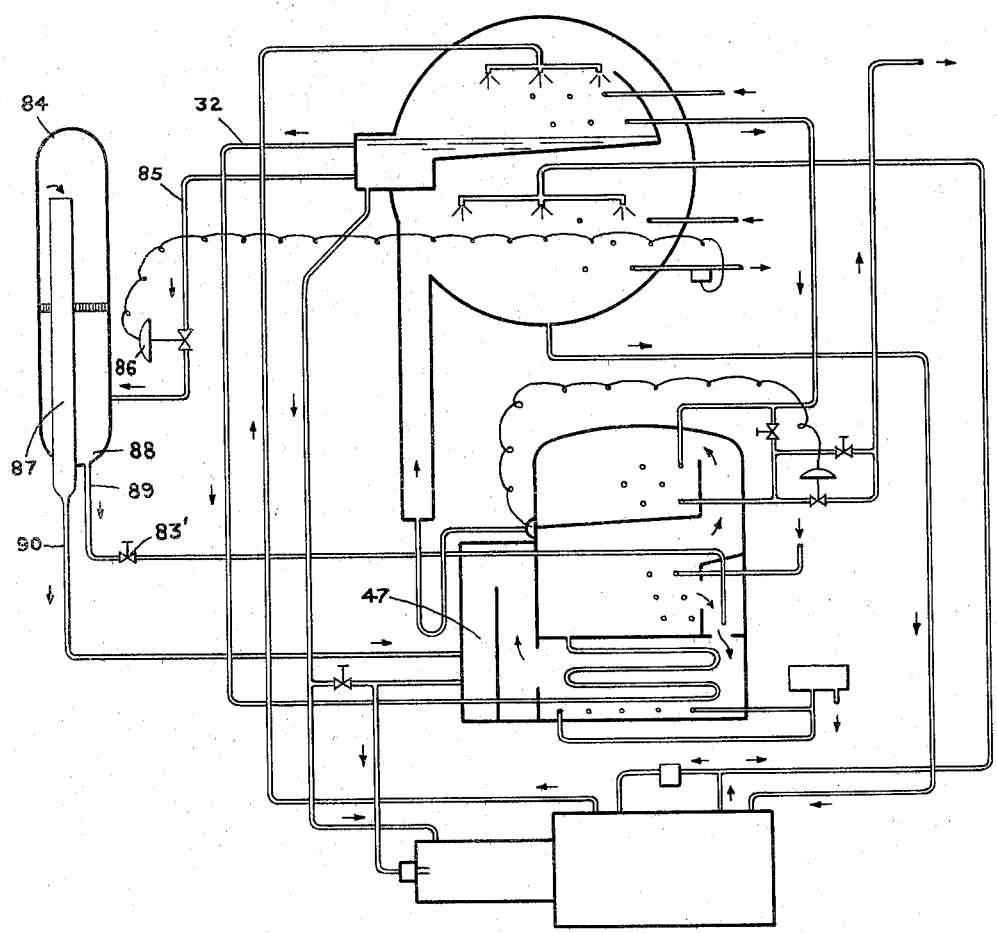
FIGURE 7 is still another diagrammatical illustration of an alternate embodiment of the system shown in FIGURE 1, utilizing a modified form of flow control apparatus.

In FIGURE 7, a still further embodiment of the apparatus shown in FIGURE 1 is provided. A reservoir 84 is connected by way of line 85 and valve 86 to absorber sump 22. A pair of outlets 87 and 88 carry weak solution from the absorber for introduction to the system for the purpose of regulating capacity, and to avoid precipitation of salt in the heat exchanger.

Outlet 88 opens into the lower side of reservoir 84 and receives weak solution to the latter when valve 86 is actuated to the open position in response to a decrease in cooling load as sensed by suitable means at the chilled water outlet.

A second outlet 87 disposed in reservoir 84 includes means forming a discharged positioned at a substantially higher elevation than outlet 88.

At maximum load conditions, valve 86 is closed. As load drops below maximum, the temperature of chilled water decreases, and in response to signal associated with this drop below and set point, the valve 86 opens. At small openings of valve 86 weak solution flow is accommodated completely by line 89 forming a path to the downstream side of the generator for diluting purposes.

As valve 86 opens further, the liquid level in chamber 84 rises until weak solution overflows outlet 87 and is directed through line 90 to chamber 47 to mix with strong solution prior to circulation of the latter to the absorber. In the manner described previously, the operation of valve 86 thus serves to regulate the flow of weak solution from absorber sump 22 through line 32 to the heat exchanger 31 and generator 12, for reconcentration therein.

Figure 10:
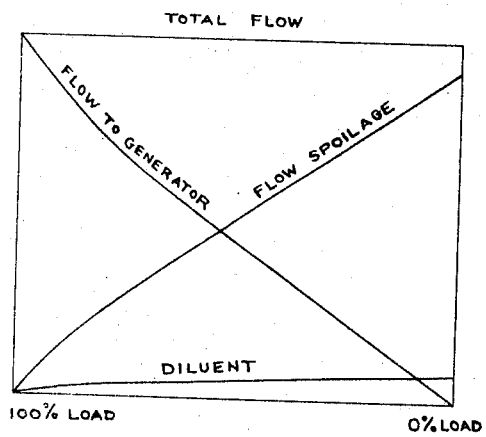
FIGURE 10 is a representative plot of the changes in flows through the several flow paths in the control system illustrated in FIGURE 1.

FIG. 10 represents the general nature of the flow changes that occur in the system as the load changes, with the control system shown in the embodiment depicted in FIGURES 1, 2 and 3. As indicated in FIGURE 10, total flow remains constant, and from 100% load down to 50% load the diluent flow is about proportional to the flow spoilage. From 50% load to zero load, the diluent flow increases at a slower rate than the flow spoilage. The increase arises from the fact that the flow spoilage increases as the 3/2 power of the height of weak solution in chamber 57 above downcomer pipe 58. The diluent flow however is increasing only as the 1/2 power of the height of weak solution above downcomer pipe 59, because said height is more than about 0.4 the diameter of the smaller pipe 59.

When the height of saturated liquid flowing into the open end of a vertical pipe is less than 0.4 the diameter, then the rate of flow is determined by the relationship holding for liquid flow over a weir, which is given by the 3/2 power of the height. Above about 0.4 the diameter, the height affects the rate of flow by only the 1/2 power of the height.

The ratio of diluent flow to flow spoilage may be varied by proper selection of the respective open cross-sectional areas of the respective downcomer pipes.

While FIGURE 10 shows only single lines as a function of load, the actual operating conditions will correspond to a family of lines. This follows since the relative distribution of liquid flows will be influenced by the temperature of water being supplied to the absorber at the inlet pipe 28 of FIGURE 1. Nevertheless, if the fractional load were to be adjusted for this condensing water temperature, the representation as given in FIGURE 10 would be very close to the actual conditions obtaining in the system.

Figure 11:
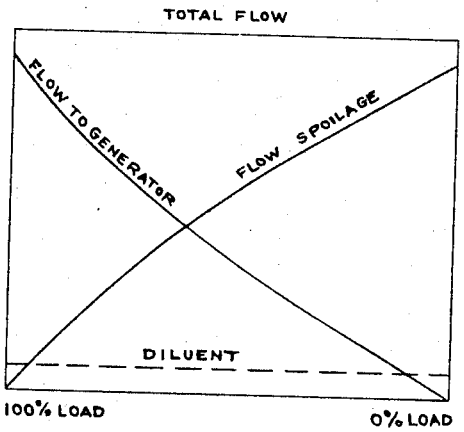
FIGURE 11 is a plot of the changes in flows through the several flow paths in the control system illustrated in FIGURE 4 or FIGURE 5.

FIGURE 11 represents flow conditions existing in the systems illustrated by FIGURES 4 and 5. Here a constant flow rate of diluent is maintained. Some loss in generator capacity can result but this type of dilution loss could be offset by the reduced cost of the control and regulating element of the machine. An increased amount of heat transfer surface in the generator and/or condenser would be required to compensate for the effect of the dilution stream flowing at full load.

Figure 12:
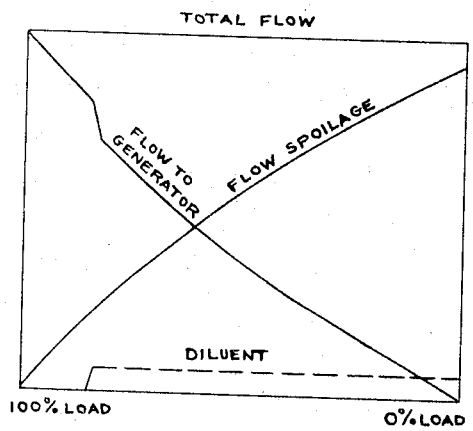
FIGURE 12 is a plot of the changes in flows through the several flow paths in the modification of the control system illustrated in FIGURE 4 or FIGURE 5.

FIGURE 12 represents flow conditions when restriction 73 in FIGURE 4 and FIGURE 5 is shut off completely at full load and only opened when the load has dropped from full load to some part load condition. In FIGURE 12 this is shown as occurring at 85% of full load.

Figure 13:
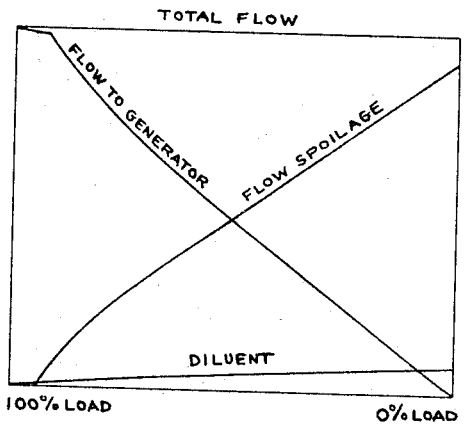
FIGURE 13 is a plot of the changes in flows through the several flow paths in the control system illustrated in FIGURE 6 or FIGURE 7.

FIGURE 13 represents the flow conditions of the systems illustrated by FIGURE 6 and FIGURE 7 which provide similar characteristics of those indicated in FIGURE 12 but without the operations of opening and closing the restriction 83 of FIGURE 6 or of FIGURE 7. In both designs, the restriction is set for a given flow rate, and is not changed with load. Flow spoilage does not begin until there has been some flow of diluent. At full load, there is neither diluent flow nor flow spoilage. As the load decreases, the diluent stream is slowly increased from its zero value, and then when the level in either the riser of FIGURE 6 or the chamber 84, of FIGURE 7, reaches that of the downcomer, flow spoilage begins.

Figure 14:
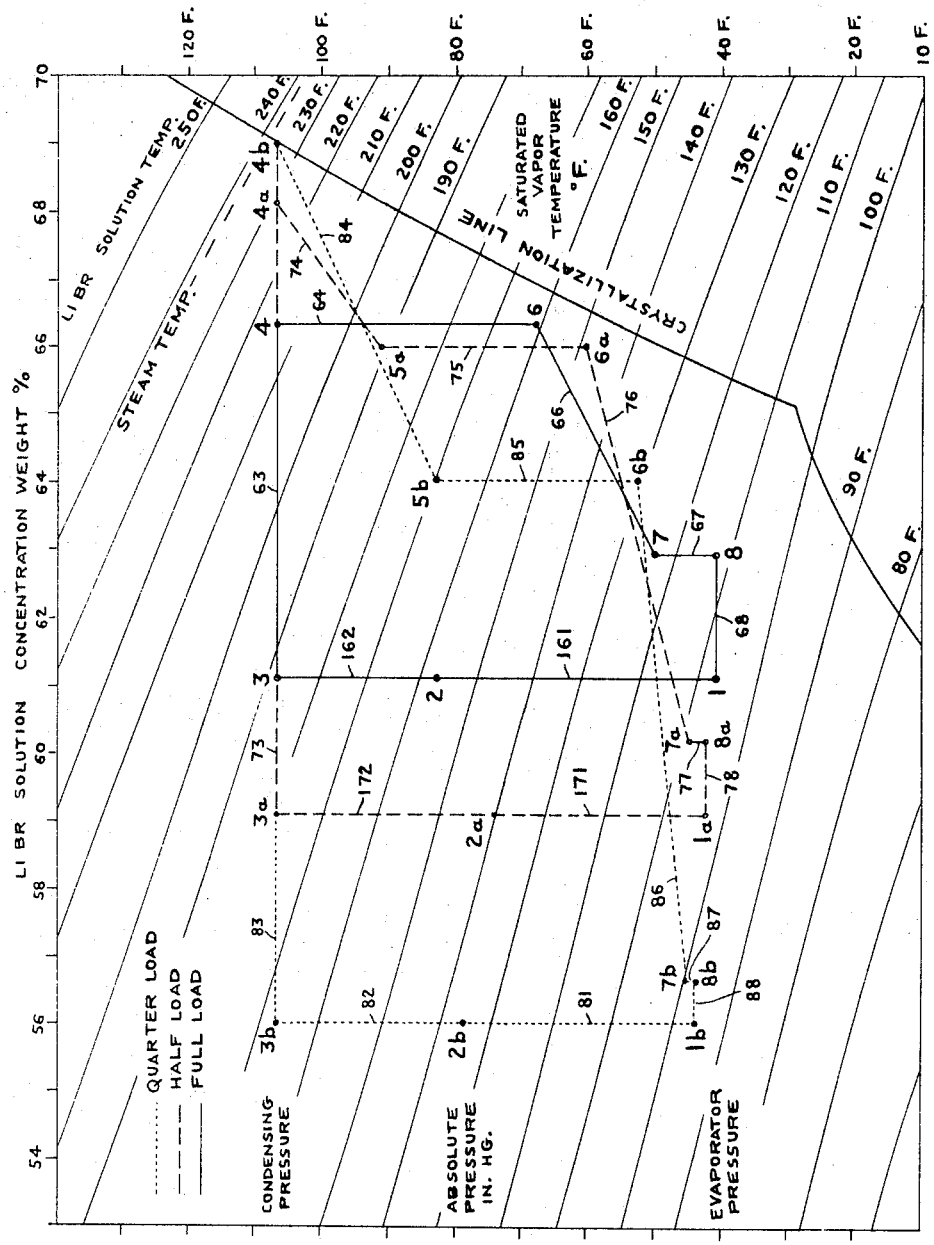
FIGURE 14 is a representative of the temperatures and concentrations of the saline solution at full load and at two part load conditions, as would occur with the control system disclosed herein.
Figure 15:
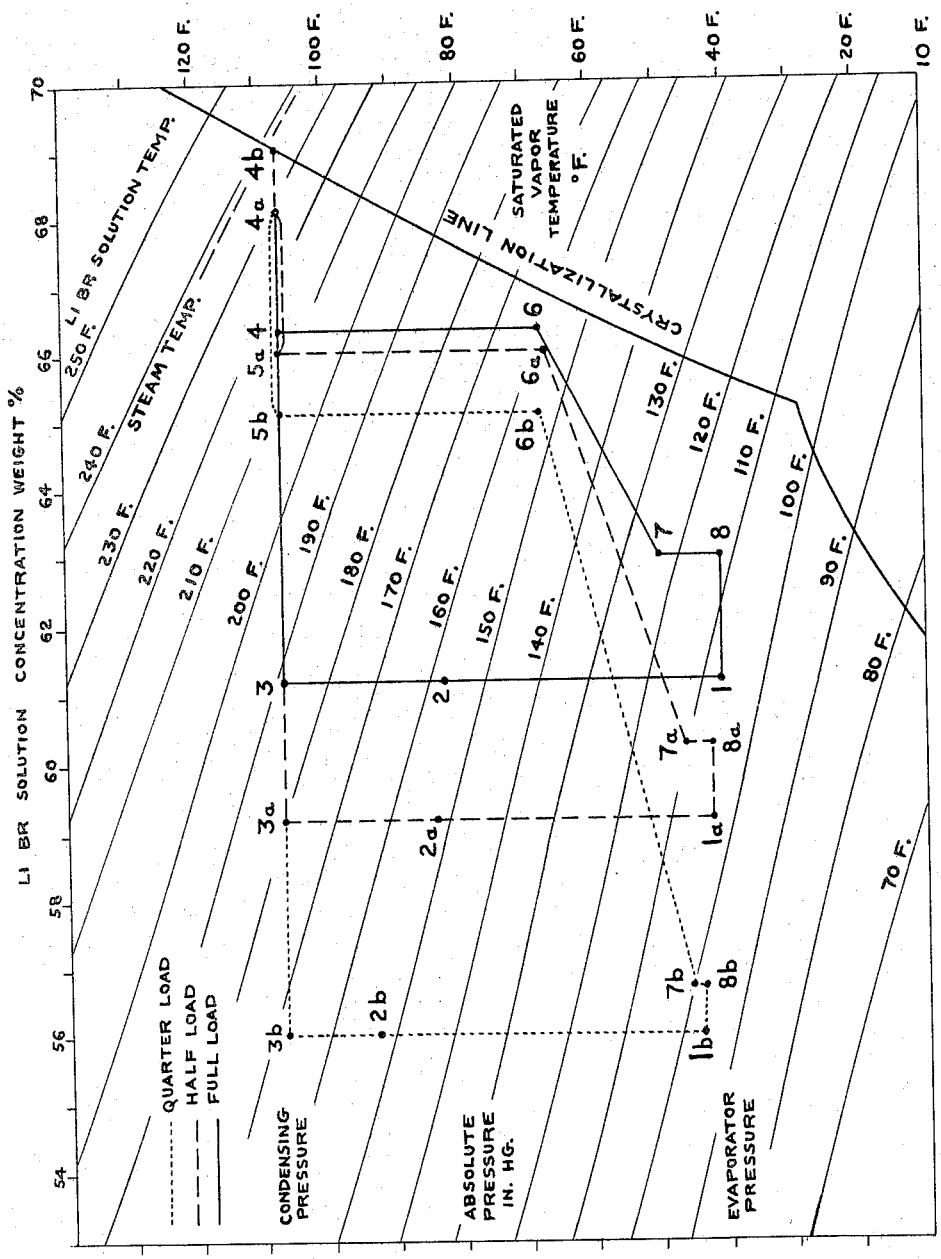
FIGURE 15 is a graphical representation similar to FIGURE 12 but with vapor-liquid phase equilibrium at the point of dilution.

FIGURES 14 and 15 represent graphically the temperature-concentration conditions in the several sections of the system at different load conditions for arrangements shown in FIGURES 1, 2, 4, 5, 6 and 7. The differences between one mode of control and another in establishing these part load conditions are too small to be shown meaningfully in this form of representation, and have no particular practical significance.

Referring to FIGURES 14 and 15 full load conditions are represented by the circuit formed by points 1, 2, 3, 4, 6, 7 and 8. The vertical lines represent weight percent of lithium bromide in aqueous solution. The horizontal lines represent absolute pressure, which correspond to the saturation temperature shown for the refrigerant water. The sloping lines correspond to the temperature of the lithium bromide solution in equilibrium with the water at the vapor pressures shown.

The weak solution at condition 1, corresponding to 61.1% lithium bromide solution at a temperature of 107° F., enters the heat exchanger and following along path 161 is heated to temperature 2, shown as 158° F. This preheated weak solution enters the generator and is further heated along line 162 to point 3 at which temperature the vapor pressure of the lithium bromide equals the pressure maintained in the generator and boiling off of water vapor commences.

The temperature of the solution increases as the concentration increases with the driving off of water vapor. Concentration of solution proceeds along line 163 to point 4, shown as a solution temperature of 215° F. and a pressure of 2.3 in. Hg. The concentrated solution, now at 66.3%, leaves the generator and enters the heat exchanger where it is cooled along path 164 to point 6, shown as 161° F.

This partially cooled strong solution, then mixes with intermediate strength solution or with weak solution, depending on the design of the flow mixer, and the final mixture is pumped into the spray trees for flow over cooling tubes in the absorber. Solution discharged by the pump is at a higher temperature than that corresponding to strong solution at the pressure in the absorber so that flashing occurs along a line which may be approximated by path 167 to condition 8. Absorption causes dilution of this intermediate strength solution to the concentration of the weak solution at point 1.

At about half load conditions, the circuit is characterized by a greater spread in concentration between weak solution leaving the absorber and strong solution leaving the generator. The path defining half load conditions is indicated by the circuit 1a to 8a inclusive. Operation is similar to full load conditions except for the lower concentration of weak solution leaving the generator going through the heat exchanger along path 171, being heated in the generator along path 172, to temperature 3a, which is lower than the corresponding point 3 for full load. The rate of flow to the generator being less than at part load, as indicated in FIGURES 10 to 13 inclusive, the solution is concentrated and heated to a temperature closer to the temperature of the steam used as energy source. The final temperature and concentration of the solution leaving the generator is shown at point 4a.

This solution is diluted so that its concentration will be reduced sufficiently to avoid crystallization in the heat exchanger. Dilution occurs along path 174 to point 5a. Partially diluted solution, shown as having a concentration of 66%, is cooled in the heat exchanger along path 175 to point 6a and then mixed. Mixing is the same as in the case of full load operation, except that the cycle conditions are now shown as paths 176, to point 7a, flashing in the absorber along path 177 to point 8a, then dilution as refrigerant vapor is absorbed, along path 178 to the initial condition shown as 1a.

At about quarter load, the pattern of flows resembles that at higher part load conditions, except that a still greater spread in concentrations will develop. The evaporator temperature is closer to the temperature required for the discharge chilled water, and the temperature of the absorber solution itself is likely to be lower than at higher loads, thus, the weak solution will perform adequately at considerably lower concentration, as is indicated by point 1b, shown as 56%. Likewise, the strong solution in the generator will approach closer to the temperature of the available heating source, in this case shown as steam of 238° F., corresponding to 24 pounds per square inch absolute.

Crystallization in the generator can be avoided or kept to a minimum by adjusting the condensing pressure setting, thus at the minimum load point, the concentration of strong solution remains to the left of the crystallization line. The higher the pressure of steam available, the higher can the condensing pressure be set without loss of machine capacity, and yet avoiding crystallization. Alternatively, when the steam pressure is lower, the condensing pressure can be set at a lower value, limited by the availability of cooling water.

The circuit for flow at about quarter load is shown by the graph consisting points 1b, to 8b inclusive being closed by the line 8b to 1b.

FIGURE 15 represents the temperature-concentration conditions in the several sections of the system at different load conditions for the flow arrangements shown in FIGURES 1, 2, 4, 5, 6 and 7. The dilution stream is admitted where solution leaves the generator 12 as distinguished from the conditions illustrated in FIGURE 14. In the latter weak solution is in equilibrium with the vapor leaving the generator by virtue of the free surface. Consequently the mixture of weak and strong solution will approach saturation conditions at the pressure of the generator.

Referring to FIGURE 1 weak solution discharged from line 59 into flow chamber 41 will absorb water vapor present in chamber 41 and will be further diluted and simultaneously raised in temperature by reason of the heat of dilution. The final mixture will thus be at the pressure corresponding to the vapor pressure of the water vapor condensing in condenser 13, allowing for the small pressure drop occurring during flow of vapor from the generator to the condenser.

The several condition points of FIGURE 15 follow a pattern similar to that shown in FIGURE 14 with the exception that vapor pressure of the solution after mixing will remain the same as vapor pressure prior to mixing.

FIGURE 15 further represents a condition which thermodynamically introduces a small loss to the cycle. The heat of dilution is only partially available for preheating the incoming weak solution to be concentrated in the generator. However, the dilution itself represents heat that could have been applied to evaporating an equivalent amount of water which would be available as refrigerant instead of as diluent. Nevertheless, this loss is small enough that it can be accepted in return for the process simplifications gained.

In the disclosed system, the criterion of highest thermal efficiency may be taken as the establishment of those temperature and concentration conditions of the lithium bromide which, when represented on the temperature-concentration graph as in FIGURE 14 or 15, lead to the largest area enclosed by the path of cycle changes. One of the requirements for attaining such an objective of maximum thermal efficiency is that dilution of the strong solution discharged from the generator should be as close as possible to the minimum required to avoid crystallization in the heat exchanger.

Experience with the type of equipment representative of commercial practice, indicates that a favorable design parameter embodies limiting of the dilution flow to a value of less than 20% of the flow rate of weak solution being directed to the generator for concentration under full load conditions. Ideally, the dilution should be such that discharged strong solution leaving the heat exchanger should be at a temperature and concentration just approaching the crystallization line. However practical considerations dictate that the effluent of the heat exchanger, as shown in FIGURES 12 and 13, be at temperature and concentration above and to the left of the crystallization line.

While the present system has been indicated as being used with steam heated generators, it is understood that hot water, or other high temperature heating fluid can also be utilized. The same control system will be used. Flow control of the heating medium will be in response to the temperature of the discharged heating medium and not in response to conditions of the process fluids comprising the lithium bromide absorbent-water refrigerant circuit.

While we have confined the present description of the invention to several illustrative embodiments thereof, it will be understood by those skilled in the art that the concept of intermixing weak solution with strong solution to avoid crystallization in response to a loading condition may be subject to various modifications. Among the advantages realized is simple control of the system and the means to avoid crystallization in the heat exchanger under all load conditions. Particularly at low load when the threat of crystallization is greatest, this concern is completely overcome.

What is claimed is:

1. In a closed absorption system circulating saline solution and having an absorber including a solution holding sump, a receiver and solution distribution means, an evaporator, a generator, a condenser, and a heat exchanger, connected to pass refrigerant and absorbent therethrough, said system including a circuit communicating the absorber and the generator and carrying weak solution in varying degrees of concentration therebetween:
   (a) said heat exchanger being communicated in said circuit and carrying streams of solution at varying degrees of concentration into heat exchange contact,
   (b) control means interposed in said circuit and being adjustable to regulate the flow rate of solution passing therethrough,
   (c) conduit means in said circuit carrying a first stream of solution from the receiver to the heat exchanger, said conduit means being communicated with the generator downstream side in which solution at a greater concentration than solution in said conduit means is held,
   (d) whereby solution in said first stream will dilute the concentration of solution leaving the generator to avoid crystallization of solution in the heat exchanger.

2. In an absorption system circulating saline solution and having an absorber including a solution holding sump, and solution distribution means, an evaporator, a generator, a condenser and a heat exchanger, connected to pass refrigerant and absorbent therethrough, said system including a circuit communicating the absorber with the generator and circulating solution in varying degrees of concentration therebetween:
   (a) said heat exchanger being positioned in said circuit and carrying streams of solution in varying concentration into heat exchange contact,
   (b) a line in said circuit communicated to the absorber and carrying a stream of unconcentrated solution for recirculation to the absorber,
   (c) conduit means in said circuit carrying a first stream of solution and being communicated at a point downstream of the generator passing solution having a concentration greater than the concentration of solution in said first stream, for forming a solution of intermediate concentration, and
   (d) flow control means in said circuit including:
      (1) a receiver connected to the absorber and adapted to hold a supply of solution passed therefrom,
      (2) said line and conduit means respectively having inlets connected to the receiver and communicated therewith to receive streams of solution therefrom.

3. In a closed absorption system circulating saline solution and having an absorber, an evaporator, a generator including an inlet communicated with the absorber to receive unconcentrated solution therefrom and discharging concentrated solution from said absorber outlet, an evaporator, a condenser, and a heat exchanger, connected to pass refrigerant and absorbent therethrough, said system including:
   (a) means communicating said generator outlet with the heat exchanger and passing solution to the latter,
   (b) a circuit communicating the absorber and the generator and including,
      (1) a first line passing a stream of solution to the generator inlet for concentration thereof,
      (2) a second line having an inlet conected to the generator and receiving unconcentrated solution,
   (c) flow control means connected to said second line for regulating the flow of solution passing thereto from the absorber,
   (d) said second line being positioned past the generator outlet and introducing a stream of unconcentrated solution from the absorber for selectively mixing with concentrated solution at a predetermined location in said circuit to form a mixture of intermediate concentration to avoid crystallization of said concentrated mixture at low load conditions on the system.

4. The combination claimed in claim 3 wherein:
   (a) said circuit including a third line forming a loop to recycle weak solution in a substantially constant flow from the absorber and back again,
   (b) said second line connected into said third line to selectively vary the concentration of solution returned to the absorber.

5. The combination claimed in claim 4 wherein:
   (a) a pumping means disposed in said third line to return a constant flow of solution of varying concentration to the absorber.

6. A method for operating an absorption system including an absorber, a generator, an evaporator and a condenser connected to circulate saline solution consisting of a vaporizable refrigerant and a salt, between the generator and the absorber, the steps for controlling said system consisting of:
   (a) passing unconcentrated solution from the absorber to the generator,
   (b) heating said unconcentrated solution to remove refrigerant therefrom and to concentrate the solution remaining,
   (c) passing said concentrated solution leaving the generator into heat exchange contact with unconcentrated solution passing from the absorber to the generator,
   (d) and introducing at part load a second stream of said unconcentrated solution to the concentrated solution leaving the generator for mixing therewith to form a stream of intermediate concentration.

7. In a closed absorption system circulating saline solution and having an absorber including solution distribution means, an evaporator, a generator, a condenser and a heat exchanger, connected to pass refrigerant and absorbent therethrough, said system including:
   (a) a circuit communicating the absorber and generator and passing solution in varying degrees of concentration therebetween,
   (b) control means in said circuit being operable to regulate the capacity of the absorption system,
   (c) said control means including:
      (1) a first line carrying a first stream of hot concentrated solution from the generator to the absorber and passing into heat exchange contact with weak solution in the heat exchanger,
      (2) a second line connected to the absorber and carrying a stream of weak solution therefrom,
      (3) means communicating said second line with the first line to intermix cool weak solution with hot concentrated solution in the latter mentioned line thereby forming a solution of intermediate concentration for introduction to the absorber distribution means, and
      (4) flow regulating means interposed in the second line being adjustable to regulate the flow rate of weak solution passing therethrough.

8. In a closed absorption system substantially as defined in claim 7 wherein said flow regulating means includes a valve means interposed in said second line and being adjustable responsive to the load on the system to vary the flow rate of solution passing therethrough.

9. In a closed absorption system containing a saline solution and having an absorber including solution distribution means, an evaporator, a generator, and a condenser connected to pass refrigerant and absorbent therethrough, said system including:
- (a) a circuit communicating the absorber with the generator and passing saline solution in varying degrees of concentration therebetween,
- (b) control means in said circuit being operable to regulate the capacity of the system,
- (c) heat exchanger means connected to the generator carrying concentrated and weak solution into heat exchange contact,
- (d) said control means includes:
  - (1) a line communicating the absorber with the generator downstream side intermixing weak solution from the absorber with concentrated solution leaving the generator,
  - (2) another line communicating the absorber with the heat exchanger downstream side and carrying weak solution for mixing with concentrated solution leaving the heat exchanger, and
  - (3) means communicating said heat exchanger with the absorber carrying diluted concentrated solution to the absorber distribution means.

10. In a closed absorption system as defined in claim 9 including flow control means in each of said respective lines, said flow control means being simultaneously operable to control flow of weak solution passing from the absorber.

11. In a closed absorption system as defined in claim 10 wherein said flow control means includes:
- (a) a receiver connected to the absorber and receiving weak solution therefrom,
- (b) each of said respective lines having an inlet connected to the receiver and receiving weak solution,
- (c) valve means communicated with the receiver and regulating the flow of weak solution passing from the absorber to the receiver.

12. In an absorption system circulating a saline solution, the combination including an absorber, an evaporator, a condenser, and a generator:
- (a) a circuit communicating the absorber and the generator for passing solution therebetween,
- (b) means feeding liquid condensing medium to the condenser,
- (c) means communicating the generator with the source of a heating medium for supplying the latter to the generator,
- (d) means forming a heat exchanger in said circuit communicating the absorber and the generator and passing weak and strong solution in heat exchange relationship, and
- (e) flow control means in the circuit for intermixing a stream of weak solution with concentrated solution in the means forming the heat exchanger, to vary the concentration of solution passing to the absorber.

13. In an absorption system as defined in claim 12 wherein the circuit communicating the absorber and the generator includes:
- (a) a first line communicating the absorber with the generator and passing weak solution to the latter,
- (b) a second line communicating the generator with the absorber and passing concentrated solution for distribution in the absorber,
- (c) a third line communicating the absorber with the heat exchanger and carrying weak solution for introduction to the latter,
- (d) said third line including:
  - (1) a conduit connected to the heat exchanger upstream side for mixing weak solution with hot concentrated solution therein,
  - (2) a second conduit carrying weak solution to the heat exchanger downstream side for mixing said weak solution with concentrated solution leaving the heat exchanger,
- (e) and flow control means interposed in said second and third lines respectively regulating the flow of weak solution passing from the absorber in response to the load imposed on the system.

14. In an absorption system as defined in claim 13 wherein said flow control means includes a receiver connected between the absorber and said second and third lines respectively, and holding a quantity of weak solution prior to passage thereof through said lines.

15. In an absorption system as defined in claim 13 wherein said flow control means includes a valve positioned upstream of the receiver and being adjustable to regulate the flow of weak solution to the latter in response to the load on the system.

References Cited by the Examiner

UNITED STATES PATENTS

| | | | |
|---|---|---|---|
| 2,565,943 | 8/1951 | Berestueff | 62—475 X |
| 3,014,349 | 12/1961 | Leonard | 62—476 X |
| 3,053,055 | 9/1962 | Johnson | 62—489 X |
| 3,053,056 | 9/1962 | Leonard | 62—489 X |

LLOYD L. KING, *Primary Examiner.*